(12) United States Patent
Thacker, III

(10) Patent No.: US 9,030,682 B2
(45) Date of Patent: May 12, 2015

(54) SYSTEMS AND METHODS FOR UNIVERSAL IMAGING COMPONENTS

(71) Applicant: William Eli Thacker, III, Sanford, NC (US)

(72) Inventor: William Eli Thacker, III, Sanford, NC (US)

(73) Assignee: Static Control Components, Inc., Sanford, NC (US)

( * ) Notice: Subject to any disclaimer, the term of this patent is extended or adjusted under 35 U.S.C. 154(b) by 84 days.

(21) Appl. No.: 13/732,875

(22) Filed: Jan. 2, 2013

(65) Prior Publication Data
US 2014/0185073 A1    Jul. 3, 2014

(51) Int. Cl.
*G06F 3/12*     (2006.01)
*G03G 15/08*    (2006.01)
*G06K 15/00*    (2006.01)
*B41J 2/175*    (2006.01)

(52) U.S. Cl.
CPC ............ *G03G 15/0894* (2013.01); *G06K 15/40* (2013.01); *G06K 15/4095* (2013.01); *B41J 2/17546* (2013.01); *B41J 2/17559* (2013.01)

(58) Field of Classification Search
USPC .................................................. 358/1.13, 1.1
See application file for complete search history.

(56) References Cited

U.S. PATENT DOCUMENTS

| | | | |
|---|---|---|---|
| 6,339,684 B1 | 1/2002 | Sato | |
| 7,136,608 B2 | 11/2006 | Miller | |
| 7,187,874 B1 | 3/2007 | Miller | |
| 7,356,279 B2 | 4/2008 | Miller | |
| 7,551,859 B2 | 6/2009 | Miller | |
| 2006/0034624 A1* | 2/2006 | Burchette et al. | ............... 399/12 |
| 2011/0206387 A1 | 8/2011 | Zhang | |
| 2012/0056957 A1* | 3/2012 | Xiao | ............................... 347/86 |

* cited by examiner

*Primary Examiner* — Martin Mushambo

(57) ABSTRACT

A method of operating a cartridge chip installed in an imaging device includes: causing, by the cartridge chip, the imaging device to enter an error condition; monitoring the timing or sequence of communication signals received from the imaging device during at least a portion of the error condition; and operating, based on the timing or sequence of the communication signals received from the imaging device during at least a portion of the error condition, in a first mode of operation compatible with a first type of imaging device or in a second mode of operation compatible with a second type of imaging device.

30 Claims, 5 Drawing Sheets

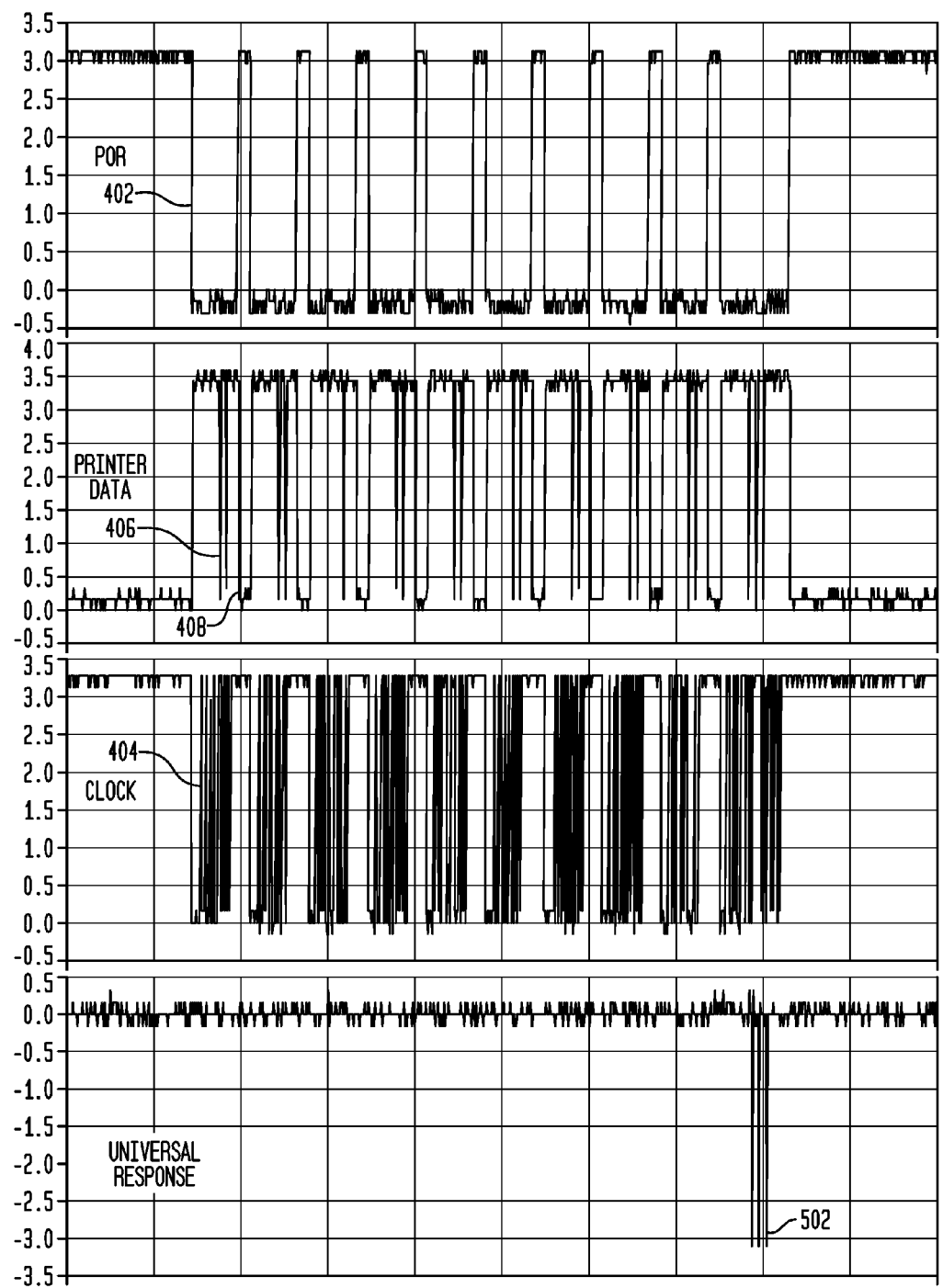

SYSTEMS AND METHODS FOR UNIVERSAL IMAGING COMPONENTS

BACKGROUND

The present invention generally relates to manufacturing or remanufacturing replaceable imaging components, and more particularly to techniques for providing a universal cartridge chip including a memory element adapted for use in multiple types of imaging cartridges.

In the imaging industry, there is a growing market for the remanufacture and refurbishing of various types of replaceable imaging cartridges such as toner cartridges, drum cartridges, inkjet cartridges, and the like. Imaging cartridges, once spent, are unusable for their originally intended purpose. Without a refurbishing process, they would simply be discarded, even though the cartridge itself may still have potential life. As a result, techniques have been developed specifically to address this issue. These processes may entail, for example, the disassembly of the various structures of the cartridge, replacing toner or ink, cleaning, adjusting or replacing any worn components and reassembling the cartridge.

Some imaging cartridges may include a cartridge chip having a memory device which is used to store data related to the cartridge or the imaging device. An imaging device may include laser printers, copiers, inkjet printers, facsimile machines and the like, for example. The imaging device, such as the printer, reads the data stored in the cartridge memory device to determine certain printing parameters and communicates information to the user. For example, the memory may store the model number of the imaging cartridge so that the printer may recognize the imaging cartridge as one which is compatible with that particular imaging device. Additionally, by way of example, the cartridge memory may store the number of pages that can be expected to be printed from the imaging cartridge during a life cycle of the imaging cartridge and other useful data. The imaging device may also write certain data to the memory device, such as an indication of the amount of toner remaining in the cartridge. Other data stored in the memory device may relate to the usage history of the toner cartridge.

Typically, each type of imaging cartridge requires a different type of cartridge chip. While necessary to the proper operation of the imaging device, the differences between certain types of chip cartridges may be subtle or slight. With the ever increasing number of types and models of imaging devices and imaging cartridges being sold, remanufacturers must stock an increasing number of types of cartridge chips, with each type of cartridge chip usable with only a single type of imaging cartridge. It would be advantageous to provide systems and methods for a universal cartridge chip which operates with more than one type or model of imaging cartridge, and thus in more than one type or model of printer. Additionally, it would be advantageous to provide systems and methods for a universal cartridge chip which allows one type of imaging cartridge to be used in multiple types of imaging devices. Furthermore, it would be advantageous to provide systems and methods for a universal cartridge chip that allows remanufacturers of imaging cartridges to reduce the number of types of cartridge chips stored in their inventory.

SUMMARY

In one aspect of the present invention a method of operating a cartridge chip installed in an imaging device includes: causing, by the cartridge chip, the imaging device to enter an error condition; monitoring the timing or sequence of communication signals received from the imaging device during at least a portion of the error condition; and operating, based on the timing or sequence of the communication signals received from the imaging device during at least a portion of the error condition, in a first mode of operation compatible with a first type of imaging device or in a second mode of operation compatible with a second type of imaging device.

In another aspect of the present invention a method of operating a cartridge chip installed in an imaging device includes: causing, by the cartridge chip, the imaging device to enter an error condition; monitoring the timing or sequence of communication signals received from the imaging device during at least a portion of the error condition; and determining, based on the timing of the communication signals received from the imaging device, if the imaging device is a first type of imaging device or a second type of imaging device; operating the cartridge chip in a first mode of operation if the imaging device is determined to be the first type of imaging device; and operating the cartridge chip in the second mode of operation if the imaging device is determined to be the second type of imaging device.

In another aspect of the present invention, a cartridge chip for use with an imaging cartridge installed in an imaging device includes: a memory element storing imaging cartridge data; and a controller for controlling the operation of the cartridge chip, causing the imaging device to enter an error condition, monitoring the timing or sequence of communication signals received from the imaging device during at least a portion of the error condition, and operating, based on the timing or sequence of the communication signals received from the imaging device, in a first mode of operation compatible with a first type of imaging device or in a second mode of operation compatible with a second type of imaging device.

In another aspect of the present invention, a cartridge chip for use with an imaging cartridge installed in an imaging device includes: a memory element storing imaging cartridge data; and a controller for controlling the operation of the cartridge chip, causing the imaging device to enter an error condition, determining, based on the timing or sequence of the communication signals received from the imaging device, if the imaging device is a first type of imaging device or a second type of imaging device, operating the cartridge chip in a first mode of operation if the imaging device is determined to be the first type of imaging device, and operating the cartridge chip in the second mode of operation if the imaging device is determined to be the second type of imaging device.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention;

FIGS. 4 and 5 show timing diagrams in accordance with present invention.

DETAILED DESCRIPTION OF THE DRAWINGS

The following detailed description of preferred embodiments refers to the accompanying drawings which illustrate specific embodiments of the invention. In the discussion that follows, specific systems and techniques for repairing, manufacturing or remanufacturing a toner cartridge comprising a cartridge chip including a memory element are disclosed. Other embodiments having different structures and operations for the repair, remanufacture and operation of other types of replaceable imaging components and for various types of imaging devices, such as laser printers, inkjet printers, copiers, facsimile machines and the like, do not depart from the scope of the present invention.

Figure 1:
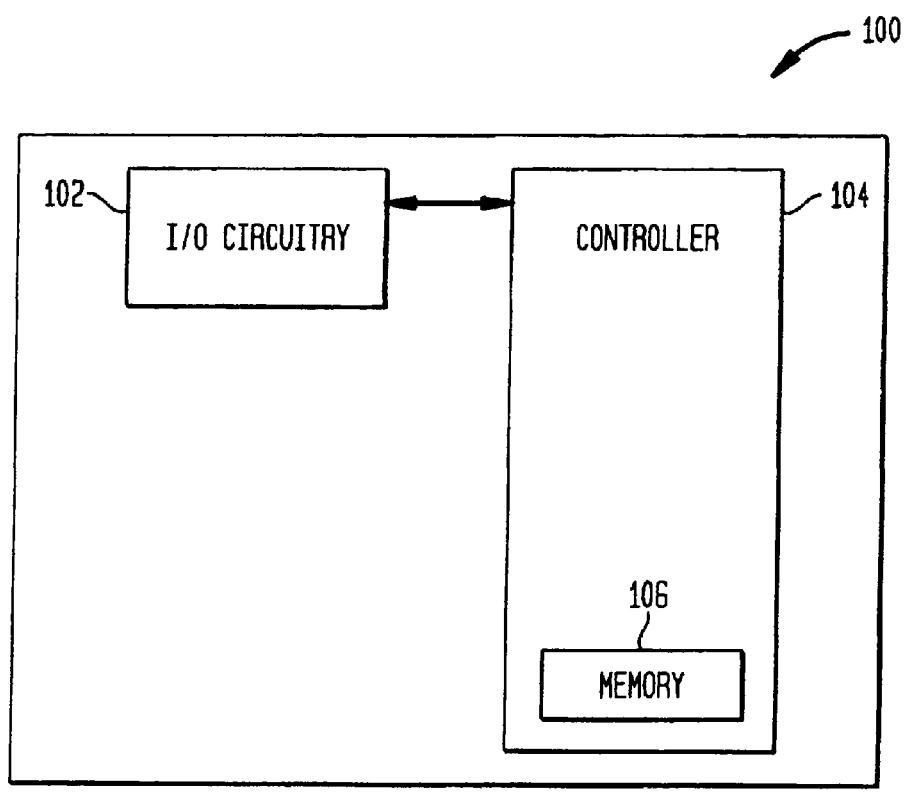
FIG. 1 shows a functional block diagram of a universal chip in accordance with the present invention.

FIG. 1 shows a functional block diagram of a universal chip 100 in accordance with the present invention. The universal chip 100 may suitably include input and output (I/O) interface circuitry 102, a controller 104, and a memory 106. The I/O interface circuitry 102 is communicatively connected to the controller 104 and provides the appropriate electronic circuitry for the controller 104 to communicate with an imaging device, such as a printer. As an example, for imaging devices which communicate utilizing radio frequency (RF), the I/O interface circuitry 102 may include a radio frequency (RF) antenna and circuitry, and for a direct wired connection to imaging devices the I/O interface circuitry 102 may include one or more contact pads, or the like, and interface circuitry.

As described in greater detail below, the controller 104 controls the operation of the universal chip 100 and provides a functional interface to the memory 106, including controlling the reading of data from and the writing of data to the memory 106 by the printer. The data read from or written to the universal cartridge chip 100 may include a printer type, cartridge serial number, the number of revolutions performed by the organic photo conductor (OPC) drum (drum count), the manufacturing date, number of pages printed (page count), percentage of toner remaining, yield (expected number of pages), color indicator, toner-out indicator, toner low indicator, virgin cartridge indicator (whether or not the cartridge has been remanufactured before), job count (number of pages printed and page type), and any other data or program instructions that may be stored on the memory 106.

The controller 104 may be suitably implemented as a custom or semi-custom integrated circuit, a programmable gate array, a microprocessor executing instructions from the memory 106 or other memory, a microcontroller, or the like.

Figure 2:
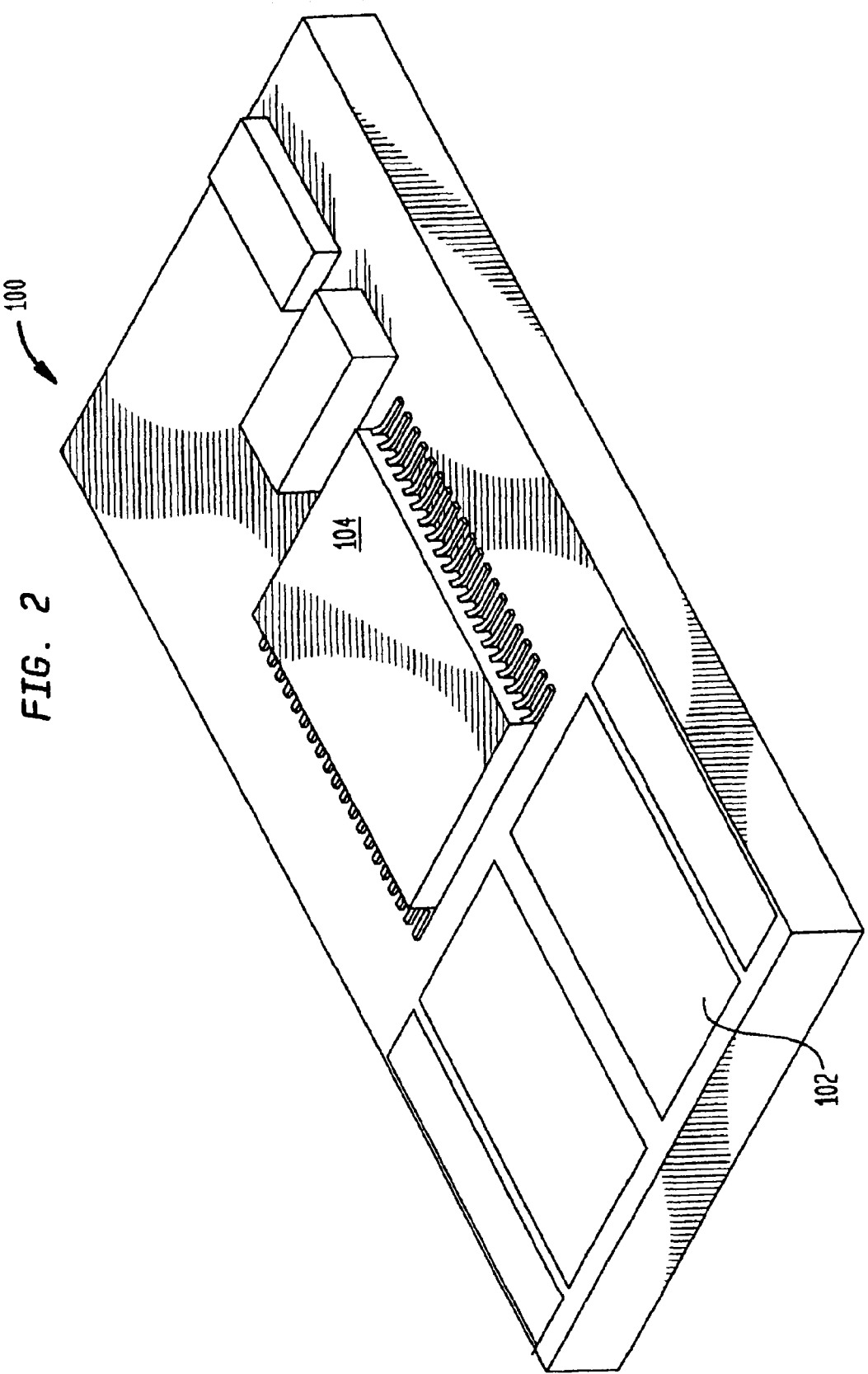
FIG. 2 shows a perspective view of a universal chip in accordance with the present invention.
Figure 3:
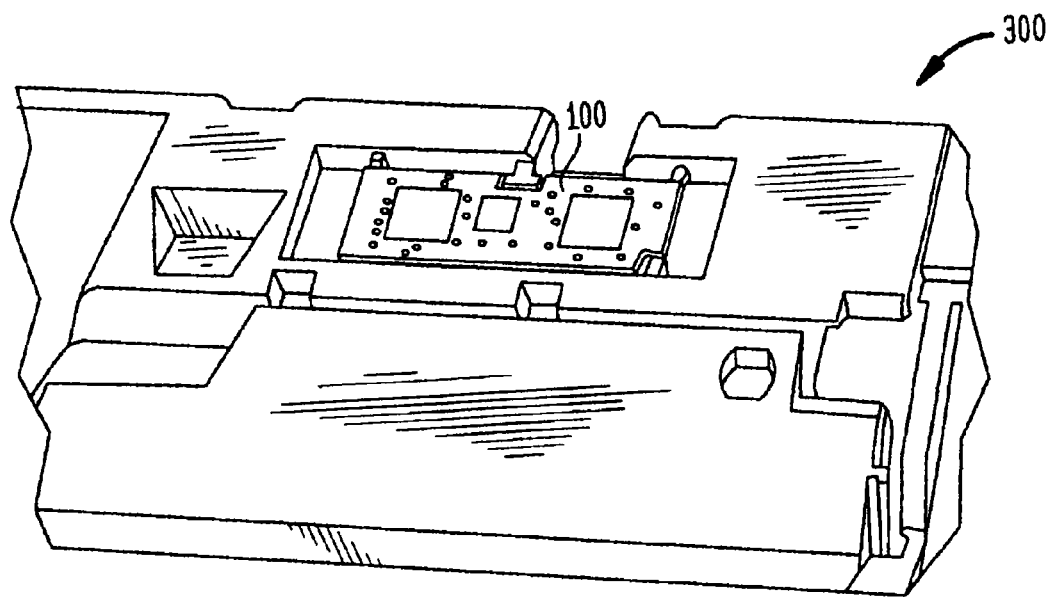
FIG. 3 shows a perspective view of a universal chip installed on an imaging cartridge in accordance with the present invention.

Additionally, the controller 104, the memory 106 and/or the I/O interface circuitry 102 may be separated or combined in one or more physical modules. These modules may be suitably mounted to a printed circuit board to form the universal cartridge chip 100. FIG. 2 shows a perspective view of one embodiment of the universal cartridge chip 100 in accordance with the present invention. FIG. 3 shows a perspective view of another embodiment of the universal cartridge chip 100 installed on an exemplary imaging cartridge 300 in accordance with the present invention.

Different printer types may communicate or interface with in different ways with the cartridge chips installed on toner cartridges. Different printer types may include printers that differ by model number, firmware version, region of operation and other differences. These different printer types may expect differing data to be stored in the cartridge chip or utilize the stored data in different ways. When installed in or attached to an imaging cartridge which is installed in an imaging device, the universal chip 100 of the present invention causes the printer to enter an error condition by not responding to a command transmitted by the printer or by responding incorrectly to the command transmitted by the printer. The error condition may be repeated a number of times to generate a statistically significant sample set of timing values associated with each of the error conditions. The repeated error conditions provide a stable and repeatable environment to detect differing timing characteristics exhibited by different printer types. Additionally, during the error condition the universal chip 100 may detect differences in the error sequence generated by different printers.

Based at least partially on the sample set of the timings or the sequence of communication signals received from the imaging device during the error conditions, the universal cartridge chip 100 may then operate in a first mode of operation compatible with a first type of imaging device or a second mode of operation compatible with a second type of imaging device. The first mode of operation may differ from the second mode of operation in at least one attribute, such as data content, communication type, and timing, for example. Additionally, the universal chip 100 may determine if the imaging device is the first type of imaging device or the second type of imaging device. If the universal chip 100 determines that the imaging device is the first type of imaging device, the universal chip 100 operates in a first mode of operation compatible with the first type of imaging device. If the universal chip 100 determines that the imaging device is the second type of imaging device, the universal cartridge chip operates in a second mode of operation compatible with the second type of imaging device.

Figure 4:
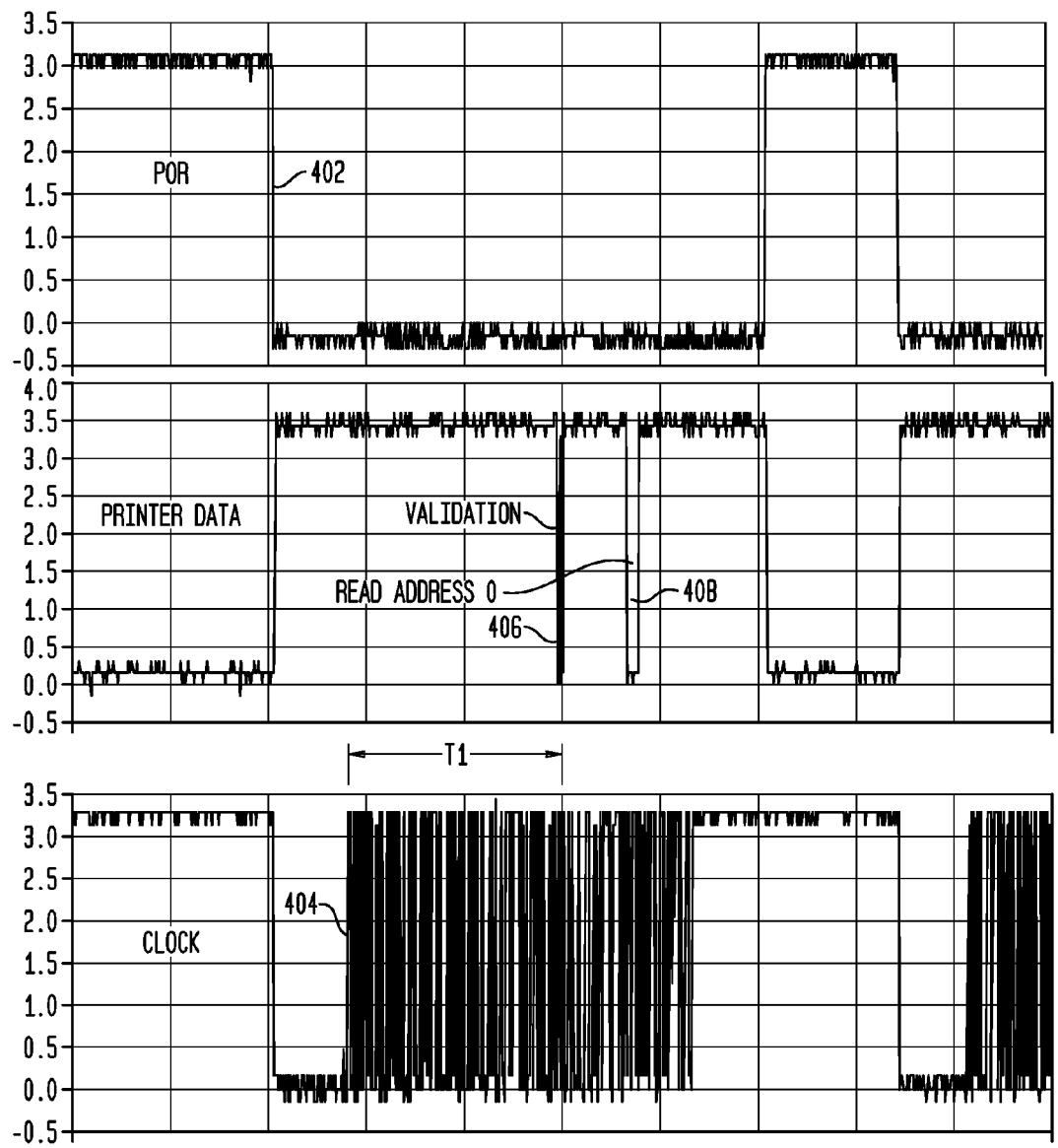

As an example, FIG. 4 shows a timing diagram 400 of communication signals transmitted by a first and a second printer type when a cartridge comprising the chip 100 is installed in the printer. After a power-on reset (POR) signal 402 is asserted, a clock signal 404 is transmitted to the chip 100. The printer then transmits a validation command 406 followed by a read command 408 to the chip 100. If the chip 100 does not respond to either command, then the printer may enter an error state and toggle POR reset and repeat the sequence multiple times, as shown in FIG. 5. The sequence of the signals transmitted by the first and second printer types may be substantially the same, but differ slightly in timing. Alternatively, the sequence of the signals transmitted may be different. For example, the time elapsed T1 from the first clock signal 404 until the validation command 406 may differ between the two printer types across a range of values. The time elapsed T1 for the first printer type may vary within a range of 1000 to 1200 clock cycles and the time elapsed for the second printer type may vary within a range of 1300 to 1500 clock cycles. These printer timing ranges are predetermined and stored in the memory 106. By counting the clock cycles between the first clock signal 404 and the validation command 406 to determine the time elapsed T1, the universal chip 100 may determine which range the clock signals fall within and then determine the printer type. By not responding to the validation command 406 and the read command 408 multiple times during the error condition, the universal chip 100 may acquire multiple data samples of the elapsed time T1 and determine a minimum time which is compared with the predetermined ranges stored in the universal chip 100 to determine the printer type. For example, if the minimum time elapsed T1 is 1050 clock cycles, the printer will be determined to be the first printer type. If the minimum time does not match either range and the chip 100 does not respond or otherwise operates in a mode of operation not compatible with the printer, the printer will be eventually forced into a terminal error condition requiring the end user to re-install the cartridge or open and close the cartridge access door to reset the timing detect circuitry of the controller 104. The process would them be repeated until the minimum time is determined that falls within one of the predetermined ranges.

Based on the determination of the printer type, the universal chip 100 will interoperate with the printer in a particular mode of operation compatible with that printer. For example, if the universal chip 100 determines the printer is an HP 1515, the universal chip 100 may present a memory map to the printer when the printer reads from the memory 106. If the universal chip 100 determines the printer is an HP 1525, the universal chip 100 may present a different memory map when the printer reads from the memory 106. FIG. 5 shows a timing diagram of a communication sequence including multiple validation commands and read commands. After the universal chip 100 has determined the printer type, it responds appropriately to the validation and read commands with a response 502 based on the determined printer type.

While in a preferred embodiment, the universal chip 100 may record the time elapsed T1 from the first clock signal 404 until the validation command 406 in order to determine the printer type, other elapsed times between other events or signals may also be used. For example, the universal chip may respond correctly to the validation command but not respond to succeeding reads. The timing of these reads may be used to determine printer type.

Additionally, instead of causing the error condition by not responding to a signal transmitted from the printer, the universal chip 100 may cause the error condition by responding incorrectly to the signal.

Color imaging devices may include multiple cartridges, with each cartridge holding a different color marking material. Each of the color cartridges is installed in a separate slot in the imaging device. Different slots of a printer type may communicate or interface with in different ways with the cartridge chips installed on imaging cartridges installed in those slots. Many color imaging devices use four different color marking materials: cyan, magenta, yellow, and black. Some color imaging devices use seven colors: cyan light, cyan dark, magenta light, magenta dark, yellow light, yellow dark, and black. Some photographic quality imaging devices use more colors while some imaging devices use a color free material to help the quality of the printed image. Also, some color imaging devices use only two cartridges, a black cartridge and a multicolor cartridge that has three or more separate colors contained therein.

In an alternate embodiment of the present invention, the universal chip 100 attached to a color imaging cartridge installed in one of the color slots of an imaging device may cause the imaging device to enter an error condition and monitor the timing or sequence of communication signals received from the imaging device during at least a portion of the error condition. The universal chip 100 may then, based on the timing or sequence of the communication signals received from the imaging device during at least a portion of the error condition, operate in a first mode of operation compatible with a first cartridge containing a first color recording material or in a second mode of operation compatible with a second cartridge containing a second color recording material. The first color and the second color are different colors. Additionally, one of the cartridges may contain multiple colors or a color free material. Additionally, as described above, the mode of operation may be compatible with a first type of imaging device or a second type of imaging device.

The universal chip 100 may determine, based on the timing or sequence of the communication signals received from the imaging device, if a slot the cartridge chip is installed in is for the first color recording material or if the slot the cartridge chip is installed in is for the second color recording material. The cartridge chip will operate in the first mode of operation if the slot the cartridge chip is installed in is determined to be the slot for the first color recording material, and operating the cartridge chip in the second mode of operation if the slot the cartridge chip is installed in is determined to be the slot for the second color recording material.

Each cartridge chip includes a unique identifier, such as a serial number, which is read by the imaging device when the cartridge is installed in the imaging device. Some imaging devices include a "black list" of banned unique identifiers with which the imaging device will not operate. In one embodiment, the universal chip 100 may cause the imaging device to enter an error condition and, based on the timing or sequences signals received from the imaging device, determine if the printer includes a "black list." If the imaging device does not include a "black list," the universal cartridge chip 100 will operate in a mode of operation compatible with that imaging device. If the printer does include a "black list," the universal chip 100 will communicate additional unique identifiers stored in its memory to the imaging device in order to determine a unique identifier that is acceptable to the imaging device and then operate in mode of operation that is compatible with that imaging device.

In another embodiment, the universal chip 100 may cause the imaging device to enter an error condition when the unique identifier is not compatible with the imaging device. During the error condition, the chip changes the unique identifier communicated to the imaging device without performing the detection described above. This enables the universal chip 100 to operate in an imaging device that uses a blacklist without detecting that the printer is a blacklisted printer.

In another embodiment, the memory 106 of the universal chip 100 includes an area for storing multiple identifiers. The area of the memory that is used to store identifiers is filled with data that does not represent valid identifiers. After authentication, the imaging device reads a section of the memory 106 where the identifiers are stored. If data is stored in this location, the imaging device updates the blacklist with the data. In this embodiment, the imaging device updates the blacklist with the data that is stored instead of valid unique identifiers. This fills the blacklist with data preventing new unique identifiers from being loaded into the blacklist from this point on.

Although the unique identifier is described as serial number, any unique identifier that can be represented by data is suitable. For example, the unique identifier could be a partial serial number, a manufacture date, a manufacturer identification, or any other desired data or code.

Alternately, multiple sequences of different error condition types may be used to determine the printer type.

In an alternate embodiment, the universal chip 100 may respond correctly to the validation command and then either not respond or respond incorrectly to a following read command.

In another aspect of the present invention, the universal chip 100 may respond incorrectly or not respond to a validation command transmitted from the printer in order to cause the printer to enter an error condition. This may be repeated a plurality of times with the universal chip 100 monitoring the timing or sequence of the communication signals. Next, before the printer reaches a threshold value for the maximum number of validation retry attempts, the universal chip 100 may respond correctly to a validation signal and then respond incorrectly or not respond to a succeeding read command. Thus, the universal chip 100 may acquire timing or sequence data over two types of cascading error conditions.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method of operating a cartridge chip installed in an imaging device comprising:
   causing, by the cartridge chip, the imaging device to enter an error condition;
   monitoring the timing or sequence of communication signals received from the imaging device during at least a portion of the error condition; and
   operating, based on the timing or sequence of the communication signals received from the imaging device during at least a portion of the error condition, in a first mode of operation compatible with a first type of imaging device or in a second mode of operation compatible with a second type of imaging device, the first mode of operation differing from the second mode of operation
   wherein causing the imaging device to enter an error condition comprises:
   failing to respond to a signal transmitted by the imaging device.

2. A method of operating a cartridge chip installed in an imaging device comprising:
   causing, by the cartridge chip, the imaging device to enter an error condition;
   monitoring the timing or sequence of communication signals received from the imaging device during at least a portion of the error condition; and
   operating, based on the timing or sequence of the communication signals received from the imaging device during at least a portion of the error condition, in a first mode of operation compatible with a first type of imaging device or in a second mode of operation compatible with a second type of imaging device, the first mode of operation differing from the second mode of operation
   wherein causing the imaging device to enter the error condition comprises:
   responding incorrectly to a signal transmitted by the imaging device.

3. A method of operating a cartridge chip installed in an imaging device comprising:
   causing, by the cartridge chip, the imaging device to enter an error condition;
   monitoring the timing or sequence of communication signals received from the imaging device during at least a portion of the error condition; and
   operating, based on the timing or sequence of the communication signals received from the imaging device during at least a portion of the error condition, in a first mode of operation compatible with a first type of imaging device or in a second mode of operation compatible with a second type of imaging device, the first mode of operation differing from the second mode of operation
   wherein monitoring the timing of communication signals comprises:
   counting a number of clock signals between two events.

4. The method of claim 3 wherein the step of counting a number of clock signals is repeated a plurality of times.

5. A method of operating a cartridge chip installed in an imaging device comprising:
   causing, by the cartridge chip, the imaging device to enter an error condition;
   monitoring the timing or sequence of communication signals received from the imaging device during at least a portion of the error condition;
   operating, based on the timing or sequence of the communication signals received from the imaging device during at least a portion of the error condition, in a first mode of operation compatible with a first type of imaging device or in a second mode of operation compatible with a second type of imaging device, the first mode of operation differing from the second mode of operation; and
   determining, based on the timing or sequence of the communication signals received from the imaging device, if the imaging device is the first type of imaging device or the second type of imaging device, operating the cartridge chip in the first mode of operation if the imaging device is determined to be the first type of imaging device, and operating the cartridge chip in the second mode of operation if the imaging device is determined to be the second type of imaging device
   wherein determining further comprises:
   comparing the timing of the communication signals to a plurality of timing ranges stored in a memory.

6. A method of operating a cartridge chip installed in an imaging device comprising:
   causing, by the cartridge chip, the imaging device to enter an error condition;
   monitoring the timing or sequence of communication signals received from the imaging device during at least a portion of the error condition; and
   operating, based on the timing or sequence of the communication signals received from the imaging device during at least a portion of the error condition, in a first mode of operation compatible with a first type of imaging device or in a second mode of operation compatible with a second type of imaging device, the first mode of operation differing from the second mode of operation
   wherein causing the imaging device to enter an error condition further comprises:

responding correctly to a validation command transmitted by the imaging device; and responding incorrectly to a read command transmitted by the imaging device.

7. A method of operating a cartridge chip installed in an imaging device comprising:
    causing, by the cartridge chip, the imaging device to enter an error condition;
    monitoring the timing or sequence of communication signals received from the imaging device during at least a portion of the error condition; and
    operating, based on the timing or sequence of the communication signals received from the imaging device during at least a portion of the error condition, in a first mode of operation compatible with a first type of imaging device or in a second mode of operation compatible with a second type of imaging device, the first mode of operation differing from the second mode of operation
    wherein causing the imaging device to enter an error condition further comprises:
    responding correctly to a validation command transmitted by the imaging device; and
    not responding to a read command transmitted by the imaging device.

8. A method of operating a cartridge chip installed in an imaging device comprising:
    causing, by the cartridge chip, the imaging device to enter an error condition;
    monitoring the timing or sequence of communication signals received from the imaging device during at least a portion of the error condition; and
    operating, based on the timing or sequence of the communication signals received from the imaging device during at least a portion of the error condition, in a first mode of operation compatible with a first type of imaging device or in a second mode of operation compatible with a second type of imaging device, the first mode of operation differing from the second mode of operation
    wherein causing the imaging device to enter an error condition further comprises:
    responding incorrectly to a first type of command a plurality of times;
    responding correctly to the first type of command; and
    responding incorrectly to a second type of command a plurality of times.

9. The method of claim 8 wherein the first type of command is a validation command and the second type of command is a read command.

10. A cartridge chip for use with an imaging cartridge installed in an imaging device, the cartridge chip comprising:
    a memory element storing imaging cartridge data; and
    a controller for controlling the operation of the cartridge chip, causing the imaging device to enter an error condition, monitoring the timing or sequence of communication signals received from the imaging device during at least a portion of the error condition, and operating, based on the timing or sequence of the communication signals received from the imaging device, in a first mode of operation compatible with a first type of imaging device or in a second mode of operation compatible with a second type of imaging device, the first mode of operation differing from the second mode of operation
    wherein the controller is for:
    causing the imaging device to enter an error condition by failing to respond to a signal transmitted by the imaging device.

11. A cartridge chip for use with an imaging cartridge installed in an imaging device, the cartridge chip comprising:
    a memory element storing imaging cartridge data; and
    a controller for controlling the operation of the cartridge chip, causing the imaging device to enter an error condition, monitoring the timing or sequence of communication signals received from the imaging device during at least a portion of the error condition, and operating, based on the timing or sequence of the communication signals received from the imaging device, in a first mode of operation compatible with a first type of imaging device or in a second mode of operation compatible with a second type of imaging device, the first mode of operation differing from the second mode of operation
    wherein the controller is for:
    causing the imaging device to enter the error condition comprises by responding incorrectly to a signal transmitted by the imaging device.

12. A cartridge chip for use with an imaging cartridge installed in an imaging device, the cartridge chip comprising:
    a memory element storing imaging cartridge data; and
    a controller for controlling the operation of the cartridge chip, causing the imaging device to enter an error condition, monitoring the timing or sequence of communication signals received from the imaging device during at least a portion of the error condition, and operating, based on the timing or sequence of the communication signals received from the imaging device, in a first mode of operation compatible with a first type of imaging device or in a second mode of operation compatible with a second type of imaging device, the first mode of operation differing from the second mode of operation
    wherein the controller is for:
    monitoring the timing of communication signals by counting a number of clock signals between two events.

13. The cartridge chip of claim 12 wherein the controller is for counting the number of clock signals a plurality of times.

14. A cartridge chip for use with an imaging cartridge installed in an imaging device, the cartridge chip comprising:
    a memory element storing imaging cartridge data; and
    a controller for controlling the operation of the cartridge chip, causing the imaging device to enter an error condition, monitoring the timing or sequence of communication signals received from the imaging device during at least a portion of the error condition, and operating, based on the timing or sequence of the communication signals received from the imaging device, in a first mode of operation compatible with a first type of imaging device or in a second mode of operation compatible with a second type of imaging device, the first mode of operation differing from the second mode of operation,
    wherein the controller is for determining, based on the timing of the communication signals received from the imaging device, if the imaging device is the first type of imaging device or the second type of imaging device, operating the cartridge chip in the first mode of operation if the imaging device is determined to be the first type of imaging device, and operating the cartridge chip in the second mode of operation if the imaging device is determined to be the second type of imaging device
    wherein the controller is for:
    comparing the timing of the communication signals to a plurality of timing ranges stored in a memory.

15. A cartridge chip for use with an imaging cartridge installed in an imaging device, the cartridge chip comprising:
    a memory element storing imaging cartridge data; and a controller for controlling the operation of the cartridge chip, causing the imaging device to enter an error condition, monitoring the timing or sequence of communication signals received from the imaging device during at least a portion of the error condition, and operating, based on the timing or sequence of the communication signals received from the imaging device, in a first mode of operation compatible with a first type of imaging device or in a second mode of operation compatible with a second type of imaging device, the first mode of operation differing from the second mode of operation, wherein the controller is for:

responding correctly to a validation command transmitted by the imaging device; and responding incorrectly to a read command transmitted by the imaging device.

16. A cartridge chip for use with an imaging cartridge installed in an imaging device, the cartridge chip comprising:

a memory element storing imaging cartridge data; and a controller for controlling the operation of the cartridge chip, causing the imaging device to enter an error condition, monitoring the timing or sequence of communication signals received from the imaging device during at least a portion of the error condition, and operating, based on the timing or sequence of the communication signals received from the imaging device, in a first mode of operation compatible with a first type of imaging device or in a second mode of operation compatible with a second type of imaging device, the first mode of operation differing from the second mode of operation wherein the controller is for:

responding correctly to a validation command transmitted by the imaging device; and not responding to a read command transmitted by the imaging device.

17. A cartridge chip for use with an imaging cartridge installed in an imaging device, the cartridge chip comprising:

a memory element storing imaging cartridge data; and a controller for controlling the operation of the cartridge chip, causing the imaging device to enter an error condition, monitoring the timing or sequence of communication signals received from the imaging device during at least a portion of the error condition, and operating, based on the timing or sequence of the communication signals received from the imaging device, in a first mode of operation compatible with a first type of imaging device or in a second mode of operation compatible with a second type of imaging device, the first mode of operation differing from the second mode of operation wherein the controller is for:

responding incorrectly to a first type of command a plurality of times;

responding correctly to the first type of command; and responding incorrectly to a second type of command a plurality of times.

18. The cartridge chip of claim 17 wherein the first type of command is a validation command and the second type of command is a read command.

19. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different, wherein the controller is for:

determining, based on the timing or sequence of the communication signals received from the imaging device, if a slot the cartridge chip is installed in is for the first color recording material or if the slot the cartridge chip is installed in is for the second color recording material, operating the cartridge chip in the first mode of operation if the slot the cartridge chip is installed in is determined to be the slot for the first color recording material, and operating the cartridge chip in the second mode of operation if the slot the cartridge chip is installed in is determined to be the slot for the second color recording material.

20. The method of claim 19 wherein determining further comprises:

comparing the timing of the communication signals to a plurality of timing ranges stored in a memory.

21. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different wherein causing the imaging device to enter an error condition comprises: failing to respond to a signal transmitted by the imaging device.

22. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different, wherein causing the imaging device to enter the error condition comprises:

responding incorrectly to a signal transmitted by the imaging device.

23. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different, wherein monitoring the timing of communication signals comprises:

counting a number of clock signals between two events.

24. The method of claim 23 wherein the step of counting a number of clock signals is repeated a plurality of times.

25. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different, wherein causing the imaging device to enter an error condition further comprises:

responding correctly to a validation command transmitted by the imaging device; and responding incorrectly to a read command transmitted by the imaging device.

26. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different wherein causing the imaging device to enter an error condition further comprises:

responding correctly to a validation command transmitted by the imaging device; and not responding to a read command transmitted by the imaging device.

27. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different wherein causing the imaging device to enter an error condition further comprises:

responding incorrectly to a first type of command a plurality of times;

responding correctly to the first type of command; and responding incorrectly to a second type of command a plurality of times.

28. The method of claim 27 wherein the first type of command is a validation command and the second type of command is a read command.

29. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different wherein the second cartridge contains three or more color recording materials therein.

30. A method of operating a cartridge chip installed in an imaging device comprising:

causing, by the cartridge chip, the imaging device to enter an error condition;

monitoring the timing or sequence of communication signals received from the imaging device during at least a portion of the error condition; and operating, based on the timing or sequence of the communication signals received from the imaging device during at least a portion of the error condition, in a first mode of operation compatible with a cartridge having a first color recording material or in a second mode of operation compatible with a cartridge having a second color recording material, wherein the first color and the second color are different wherein the second color is clear or color free.

* * * * *